US006775750B2

(12) United States Patent
Krueger

(10) Patent No.: US 6,775,750 B2
(45) Date of Patent: Aug. 10, 2004

(54) SYSTEM PROTECTION MAP

(75) Inventor: Steven D. Krueger, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 174 days.

(21) Appl. No.: 10/141,661

(22) Filed: May 8, 2002

(65) Prior Publication Data
US 2003/0018860 A1 Jan. 23, 2003

Related U.S. Application Data
(60) Provisional application No. 60/302,053, filed on Jun. 29, 2001.

(51) Int. Cl.$^7$ ............................................. G06F 12/00
(52) U.S. Cl. ........................ 711/152; 711/163; 710/200
(58) Field of Search ........................ 711/152–153, 163, 711/129–130, 147, 173; 710/200; 709/104; 714/8

(56) References Cited

U.S. PATENT DOCUMENTS

| 4,814,982 | A  |   | 3/1989  | Weir |       |
|-----------|----|---|---------|------|-------|
| 5,161,227 | A  | * | 11/1992 | Dias et al. | 709/104 |
| 5,566,319 | A  | * | 10/1996 | Lenz | 711/147 |
| 5,991,895 | A  | * | 11/1999 | Laudon et al. | 714/8 |
| 6,003,123 | A  | * | 12/1999 | Carter et al. | 711/207 |
| 6,253,274 | B1 | * | 6/2001  | Boonie et al. | 710/200 |
| 6,260,120 | B1 | * | 7/2001  | Blumenau et al. | 711/152 |
| 6,567,897 | B2 | * | 5/2003  | Lee et al. | 711/153 |

FOREIGN PATENT DOCUMENTS

EP          0 598 570 A          5/1994

* cited by examiner

Primary Examiner—Nasser Moazzami
(74) Attorney, Agent, or Firm—Robert D. Marshall, Jr.; W. James Brady, III; Frederick J. Telecky, Jr.

(57) ABSTRACT

A method and apparatus is provided for operating a digital system having several processors (102, 104) and peripheral devices (106, 116) connected to a shared memory subsystem (112). Two or more of the processors execute separate operating systems. In order to control access to shared resources, a set of address space regions within an address space of the memory subsystem is defined within system protection map (SPM) (150). Resource access rights are assigned to at least a portion of the set of regions to indicate which initiator resource is allowed to access each region. Using the address provided with the access request, the region being accessed by a memory access request is identified by the SPM. During each access request, the SPM identifies the source of the request using a resource identification value (R-ID) provided with each access request and then a determination is made of whether the resource accessing the identified region has access rights for the identified region. Access to the identified region is allowed to an initiator resource only if the resource has access rights to the identified region, otherwise an error process is initiated (151).

20 Claims, 6 Drawing Sheets

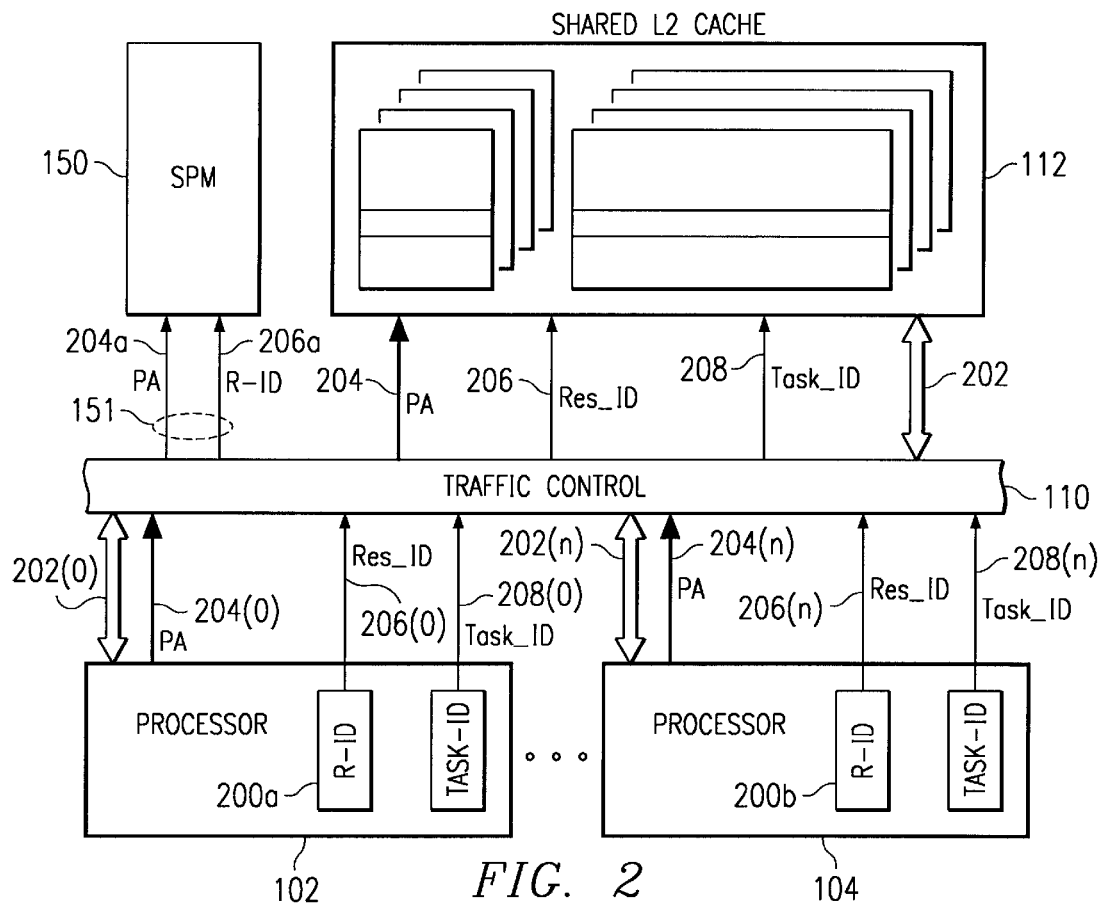
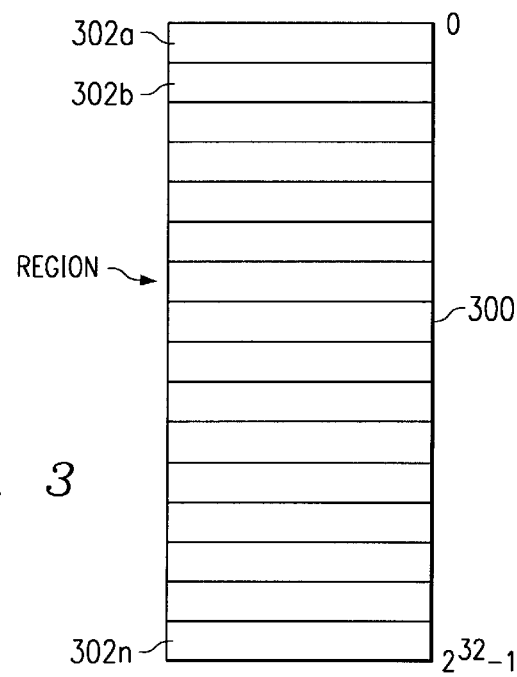
FIG. 2
FIG. 3

SYSTEM PROTECTION MAP

This application claims priority under 35 USC §119(e)(1) of Provisional Application Number 60/302,053, filed Jun. 29, 2001.

FIELD OF THE INVENTION

This invention generally relates to microprocessors, and more specifically to improvements in memory access protection circuits, systems, and methods of making.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

An operating system (OS) is generally provided to manage the digital system by controlling resources and scheduling execution of various program modules or tasks. In a system with several processors, it may be convenient to have a separate OS for each processor. Generally an OS assumes that it is in control of all system resources. Many OSs were not designed in a manner to share memory and resources with another OS. Therefore, when two or more OSs are combined in a single system, resource allocation problems may occur. Conflicts over use of memory or peripheral devices may have dire consequences for system operation.

SUMMARY OF THE INVENTION

It has now been discovered that the OSs must cooperate in partitioning the system, either statically or dynamically. A system protection map (SPM) can then be used to ensure that the agreed upon partitioning is actually followed. An SPM doesn't necessarily supplant memory management facilities that are present on a given processor, but rather provides an additional level of protection in order to protect operation systems from each other.

In general, and in a form of the present invention, a method is provided for operating a digital system having a plurality of initiator resources including a plurality of processors connected to a shared memory subsystem. Two or more of the processors execute separate operating systems. In order to control access to shared resources, a plurality of regions within an address space of the memory subsystem is defined. Initiator resource access rights are assigned to at least a portion of the plurality of regions to indicate which initiator resource is allowed to access each region. Using the address provided with the access request, the region being accessed by a memory access request is identified. During each access request, the source of the request is identified using a resource identification value provided with each access request and then a determination is made of whether the initiator resource accessing the identified region has access rights for the identified region. Access to the identified region is allowed to a initiator resource only if the initiator resource has access rights to the identified region.

In another embodiment of the present invention, a digital system is provided with several processors connected to access a shared memory subsystem. Resource identification means is connected to the plurality of processors for indicating which of the plurality of processors is requesting access to the shared memory subsystem. Protection circuitry is connected to receive a resource identification value from the resource identification means in response to an access request to the shared memory subsystem. The protection circuitry is operable to inhibit access to the shared memory in response to the resource identification value.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 2 is a more detailed block diagram of the system of FIG. 1 illustrating resource identification circuits;

FIG. 3 is a schematic illustration of an address space in the megacell of FIG. 1 partitioned into regions, according to an aspect of the present invention;

Corresponding numerals and symbols in the different figures and tables refer to corresponding parts unless otherwise indicated.

DETAILED DESCRIPTION OF EMBODIMENTS OF THE INVENTION

Figure 1:
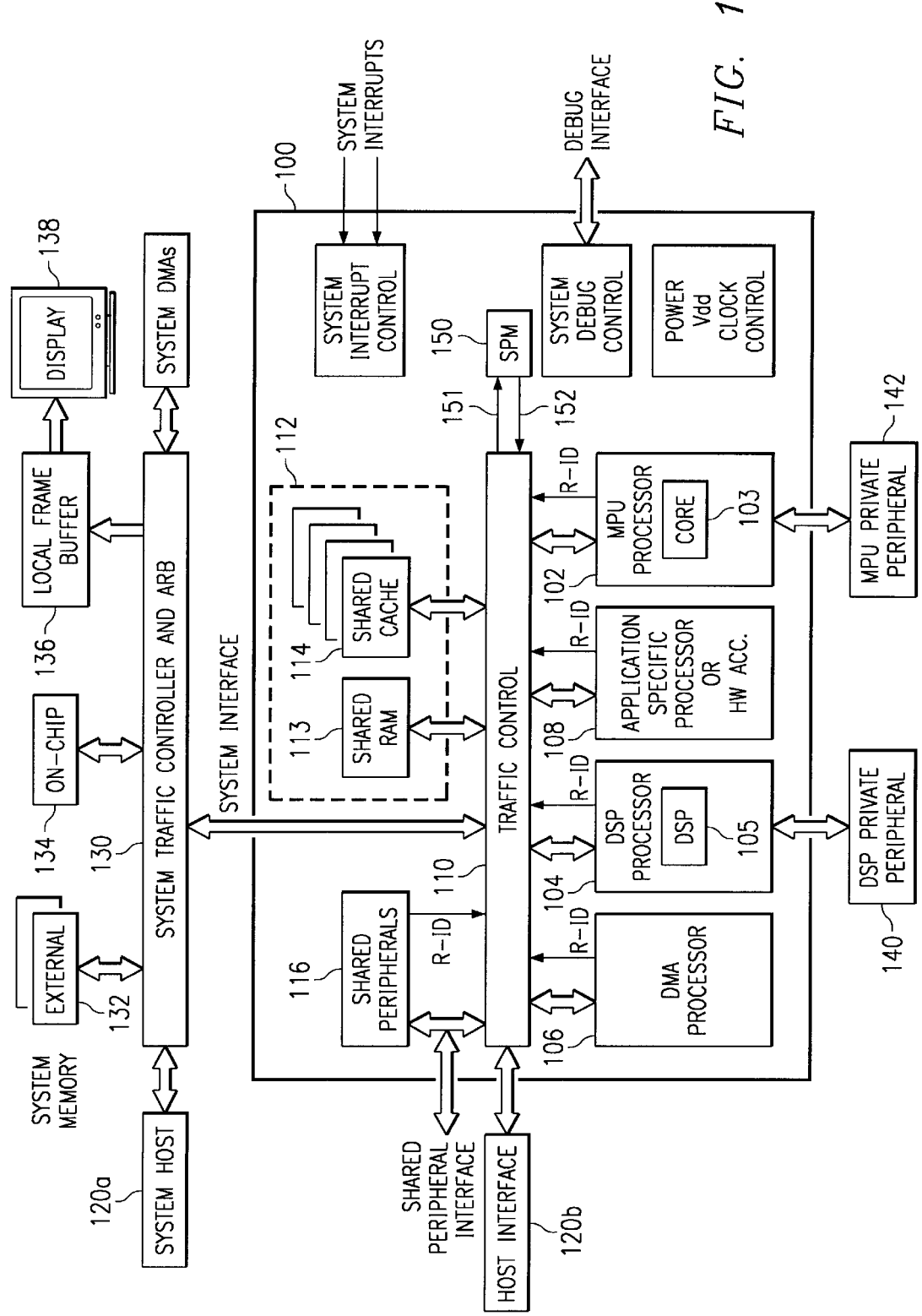
FIG. 1 is a block diagram of a digital system that includes an embodiment of the present invention in a megacell having multiple processor cores and system protection map (SPM) circuitry.

System protection cannot prevent conflict, so to speak. If OS 1 on processor A and OS 2 on processor B both think they have total control of device D, then there is a problem. Protection doesn't really make that problem go away, it only detects failures of partitioning of the system. To be successful, the OS's must cooperate in partitioning the system, either statically or dynamically. A system protection map (SPM) can then ensure that the agreed upon partitioning is actually followed.

To partition statically, a system developer allocates resources (memory and devices) to each processor and this partitioning doesn't change during system operation. This works well in many embedded systems.

A more interesting situation is when the partitioning may be changed during operation. In this case, there must be a means of negotiation for system resources and a means of updating the SPM.

A partitioning is most interesting if there are some resources that may be shared between the two OSs and that are accessible to both. Certainly, there would be the need for shared memory buffers in most multiprocessor systems. This type of resource is marked in the SPM as accessible to both and an additional protocol is used to control access (e.g. semaphores).

As used herein, "separate OS" doesn't require "different OS." It may well be the case, especially on homogeneous processors, that each processor runs a copy of the same OS, each running as a uniprocessor OS with only a few extensions. These extensions allow the OS to know about resource negotiation and define or interface with a shared memory mailbox protocol. Typically, these extensions can be added as device drivers to almost any uniprocessor OS, turning two or more instantiations of the same OS into a loosely coupled multiprocessor system.

While for a particular digital system embodiment, a static assignment of resources to loosely coupled processors through partitioning of hardware may be done, it is more economical to serve a variety of applications by making this assignment through software either statically or dynamically so that different systems can be served by the same multiprocessor hardware. Of course, there may be private resources that cannot be shared due to the topology of the system. Thus, in such an embodiment, an SPM advantageously ensures that the agreed upon partitioning is actually followed.

Although the invention finds particular application to Digital Signal Processors (DSPs), implemented, for example, in an Application Specific Integrated Circuit (ASIC), it also finds application to other forms of processors. An ASIC may contain one or more megacells which each includes custom designed functional circuits combined with pre-designed functional circuits provided by a design library.

While the present embodiments envision a single chip system containing this facility, it might also be embodied in a system that spans many chips and might include systems with more than one processor chip and possibly additional support chips where some proper or improper subset participate in embodying this invention.

FIG. 1 is a block diagram of a digital system that includes an embodiment of the present invention. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring still to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

In other embodiments of the present invention, the traffic control block is a generalized concept that could be a shared bus as is found in many designs, or could be a switched interconnection fabric. It includes both the paths for the transfer of data and addresses, and also the control necessary to manage routing and contention in the interconnect. The description of the traffic control block should not limit the applicability of the invention.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

In this embodiment, DSP processor 104 and MPU 102 are each executing a separate OS. According to an aspect of the present invention, a system protection map (SPM) 150 is connected to traffic controller 110 in order to protect resources being managed by one OS from being mistakenly accessed under direction of the other OS. Each processor, DMA circuit, or peripheral device that can imitate access requests provides a resource identification value on signals R-ID along with each memory access request. As each request is arbitrated within traffic controller 110 and then passed to memory subsystem 112, SPM 150 receives the address and the resource identification value of the pending access request from traffic controller 110 on signals 151.

SPM 150 includes circuitry to define a set of address space regions within the address space of the memory mapped devices serviced by traffic controller 110, including memory subsystem 112, 132, 134 and peripherals 116, 136. During system initialization, a trusted agent assigns initiator access rights to the set of address space regions. The assignments do not need to be fixed after system initialization but may be changed through a negotiation protocol. However, since the changes in the SPM are made by a program running on one of the processors, it can't be made completely secure from misuse by that processor's OS. The separation of this mechanism from other memory management mechanisms adds a fair bit of reliability to the system.

In response to each pending memory access request, the SPM identifies which address space region is being requested by examining a most significant portion of the address bus provided on signals 151. SPM 150 then determines if the initiator resource that initiated the pending memory request, as indicated by a resource identification value provided on signals 151, is allowed to access the address space region. If the initiator resource has access rights to the requested address space region, the request is allowed to proceed. If the initiator resource does not have access rights to the requested address space region, then SPM 150 aborts the access and indicates a bus error on signal 152 to the requested access to be aborted.

A bus error then gives a status back to the initiator that there was something wrong with its request. A distinguished type of bus error is used for this error rather than giving just some general indication of an error so that the requesting resource can than appropriately recover from the bus error.

In other embodiments, one or more of the requesting resources may not have facilities to handle a bus error. In this case, an error signal from the SPM can be connected to interrupt the offending processor. In another embodiment, decision circuitry is provided within the SPM that evaluates identification signals 151 and asserts a bus error abort signal for certain resources and asserts an interrupt signal to a system processor indicated by the identification signals, depending on the value placed on the identification signals.

FIG. 2 is a more detailed block diagram of the system of FIG. 1 illustrating resource identification circuits associated with each requesting resource. Various inter-connections between processors 102, 104 and L2 cache 112 are illustrated. Resource identification values are provided by a resource-ID register associated with each requester resource; such as R-ID register 200a associated with processor resource 102 and R-ID register 200b associated with processor resource 104. Other requesting resources, such as DMA engine 106, various peripheral devices 116 and coprocessors 108 within megacell 100 and/or an external host connected to megacell 100 that can initiate memory requests are also provided with resource ID registers, but are not illustrated in this figure for simplicity. Each requesting resource typically has its own associated R-ID register; however, other embodiments may choose to provide resource ID registers for only a selected portion of the resources.

In this embodiment, a task ID is provided by a task-ID register that is loaded during each context switch to identify a currently executing task. A task register associated with a non-processor resource, such as DMA, a coprocessor, etc, is loaded with a task value to indicate the task that it is supporting. In another embodiment, only processor resources that execute program modules have an associated programmable task-ID register. In this case, a system wide default value may be provided for access requests initiated by non-processor resources such as DMA. The default value may be provided by a programmable register or hardwired bus keepers, for example. In another embodiment, task-ID registers may be omitted completely.

A data bus 202(n), physical address bus 204(n), resource ID signals 206(n), and task ID signals 208(n) are provided by each resource for each L2 request. Traffic controller 110 provides request priority selection and sends the highest priority request to L2 cache 112 using data bus 202, physical address bus 204, resource ID signals 206, and task ID signals 208 to completely identify each request. In the present embodiment, TLBs are used to convert virtual address to physical address. In another embodiment, a TLB may not be needed and will therefore not provide the physical address signals for each request. In that case, address signals are provided directly from registers associated with the requesting resource, for example.

As mentioned earlier, SPM 150 is connected to receive signals 151 from traffic controller 110. These signals include an address portion 204a that is a copy of a most significant portion of address bus 204 and resource ID value 206a that is a copy of resource ID signals 206.

In another embodiment, the R-ID and Task-ID registers are not necessarily part of the resource core and can be located elsewhere in the system, such as a memory mapped register for example, and associated to a resource bus. The only constraint is that a task-ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

FIG. 3 is a schematic illustration of an address space 300 in the megacell of FIG. 1 partitioned into a set of address space regions 300a–n, according to an aspect of the present invention. Address space 300 represents a 32-bit physical address and includes all memory, such as shared RAM 113 and cache 114, and memory mapped peripheral devices within megacell 100, as well as memory and memory mapped devices connected to megacell 100. In other embodiments of the present invention, address spaces of other than 32 bits can be used.

Address space regions 300a–300n may be of a uniform size, as illustrated here, or they may be asymmetrical. There may be a relatively small number of them, as illustrated here, or there may be a larger number of regions to provide a finer grain of resolution. For each address space region, a set of access rights is maintained that specify which requesting resources are permitted to access any memory mapped location within that address space region.

Figure 4A:
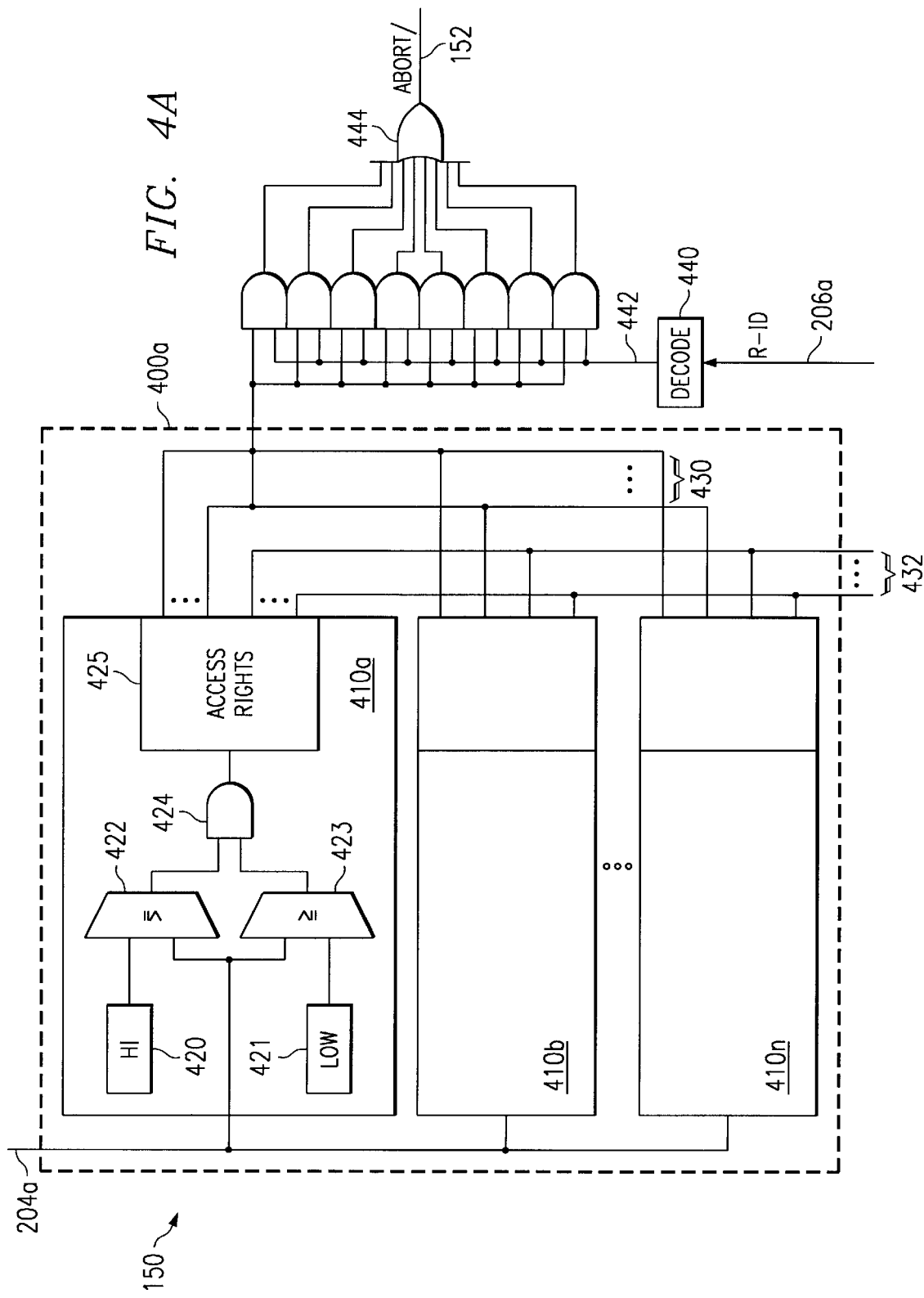
FIG. 4A is a block diagram of a physical address attribute map of the system of FIG. 1 implemented with associative mapping.

FIG. 4A is a block diagram of system protection map (SPM) 150 of the system of FIG. 1 implemented with associative mapping circuitry 400a. Associative mapping relies on address range comparisons to find region boundaries. The physical address of a pending request is compared to several address ranges and the matching one identifies which of the regions is being requested. Comparison block 410a is representative of any number of comparison blocks 410a–410n that can be instantiated in SPM 150. Within comparison block 410a is high limit register 420 and a low limit register 421. Comparator 422 compares the contents of high limit register 420 and a proffered physical address from address bus 204*a* and asserts an output signal if the physical address is less than or equal to the high limit. Likewise, comparator 423 asserts an output signal if the physical address is greater than or equal to the contents of low limit register 421. AND gate 424 is connected to receive the two signals from the two comparators and to enable access rights register 425 to drive signals 430 and attribute signals 432 only when the proffered physical address has a value between the low limit and the high limit. In this embodiment, access rights register 425 contains eight bits, each bit representing one request resource. Thus, access rights for up to eight resources can be assigned to each address region. Each high limit and low limit register and each associated access rights register is arranged so that it can be read and written by a processor in megacell 100 as memory mapped registers. In an alternative embodiment, some or all of these registers can be configured as ROM or electrically alterable programmable ROM (EAPROM), for example.

Decode circuitry 440 receives R-ID signals 206*a* and decodes a proffered resource identification value into one of eight ID signals 442. The ID signals are individually compared to rights signals 430 by comparison circuitry 444. If the requesting resource does not have a corresponding access right bit set, then abort signal 152 is asserted and the requested memory access is inhibited and error processing is invoked.

Attribute signals 432 can be used to place restrictions on the access rights of a resource, such as permitting read only access, for example.

Associative mapping has several features that commend it, as follows: complexity scales easily by scaling the number of comparison registers; it can be arranged to easily support differing physical address sizes; and it supports highly variable address regions including regions that are quite small or large. Associative mapping also has several disadvantages, as follows: anomalous operation may occur if one or more limit register are set incorrectly, such that more than one address range matches the proffered physical address; a megamodule that embodies a SPM may not have a sufficient number of address range comparison blocks for a particular instantiation of a system; each comparison block is relatively expensive in terms of transistor count and resulting integrated circuit (IC) die size, such that a fully configured associative address mapped SPM may be prohibitive for embedded system applications.

Figure 4B:
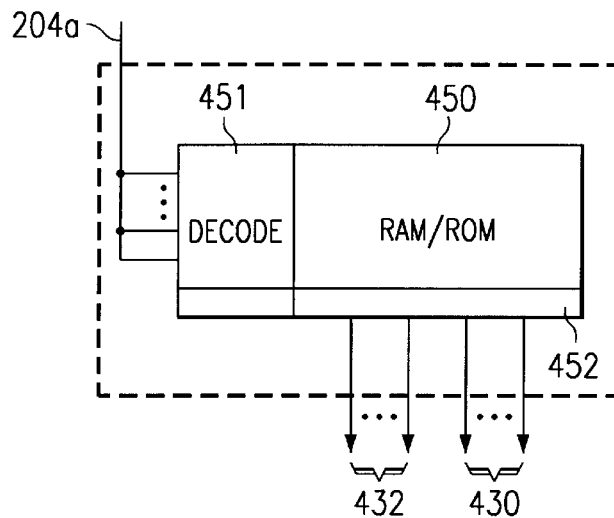
FIG. 4B is a block diagram of an alternative embodiment of a physical address attribute map of the system of FIG. 6 implemented with direct mapping.

FIG. 4B is a block diagram of an alternative embodiment mapping circuitry 400*b* implemented with direct mapping that can be used in SPM 150 in place of mapping circuitry 400*a*. Direct mapping uses a portion of the physical address as an index into a table of attributes. If the table is large enough to map all physical addresses implemented in the system, there is no need for associative type comparisons. In FIG. 4B, table 450 comprises a number of entries that are selectable by decoding a portion of physical address bus 204*a* via decoder 451. In the present embodiment, address bus 204 is a 32-bit bus. Each entry in table 450 represents a fixed size of 16 MB of the entire 4 gigabyte physical address space. Each entry represents an address range of twenty-four bits, therefore only eight most significant address bits need be decoded by decode circuitry 451. For full coverage of the eight address bits, 256 entries are required. Each entry is arranged so that it can be read as a memory mapped item. The base address of the SPM table can be instantiated at various locations in various embedded systems and is aligned on its size.

Direct mapping is advantageous in that it can be inexpensive in terms of transistor count and IC area. It does not suffer from multiple matches, and if fully populated it always covers the entire physical memory address space. However, direct memory has some disadvantages, in that the complexity of a direct mapped scheme is in fixed overhead that is not easily scalable. It does not readily support small region sizes without an excessive number of table entries.

On many implementations of embedded systems, much of the contents of the SPM table will be constant because it corresponds to addresses that are for on-chip resources, or addresses that cannot have any device due to bus limitations. In many cases, only physical addresses that can address devices on an external bus need to have programmable registers. Thus, a portion of table 450 is implemented as ROM and a portion is implemented as RAM. Alternatively, a portion may be implemented as EAPROM or not implemented at all, for example. When unused entries are not implemented, the SPM cost scales with the portion of the address space used, advantageously allowing very small system configurations to have a very low cost SPM.

Figure 5:
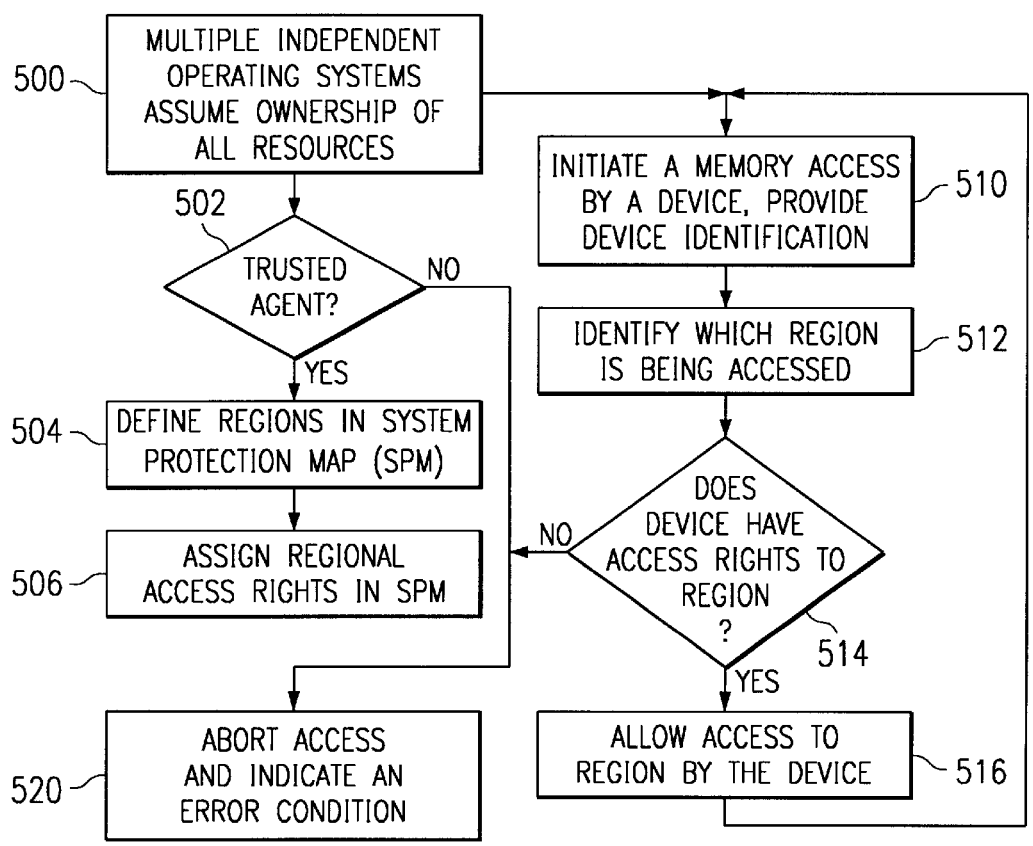
FIG. 5 is a flow chart illustrating a method of operating the system of FIG. 1 according to aspects of the present invention.

FIG. 5 is a flow chart illustrating a method of operating the system of FIG. 1 according to aspects of the present invention. In step 500, multiple independent operating systems assume ownership of all resources within the system. Generally, an individual operating system is not aware of other OSs in the same system. An OS executing on processor 102 is allocated resources directly associated with processor 102, such as peripherals 142. An OS executing on processor 104 is allocated resources directly associated with processor 104, such as peripherals 140. Shared resources, such as shared memory 112 must be allocated to both OSs. Programming conventions within application software being executed under each OS attempts to prevent resource conflicts.

In order to enforce correct sharing of resources, system protection map (SPM) 150 is setup up by a trusted agent in steps 500–506. One of the OSs is designated to be the master of the system and is responsible for setting up the SPM. During system initialization, an SPM management task within the master OS accesses the SPM and initializes the access rights registers, as described above. A security sequence is performed in step 502 for each access to SPM 150 to verify that only the SPM manager task is accessing the SPM. If a non-trusted agent is attempting to access the SPM, the access is aborted and an error is indicated in step 520. The security sequence will be described in more detail later. If the trusted SPM manager task is accessing the SPM, then the address region registers are set in step 504. For a direct mapped embodiment, this step does not need to be performed. In step 506, the access rights registers are initialized.

In an embodiment of the present invention in which the configuration is static, the SPM would not be set by any OS, but rather as a startup step before starting the OSs.

Once the SPM is configured, operation of the system application software commences. Execution of software initiates memory requests, as represented in step 510. The source of each memory request is identified using the resource ID circuitry described earlier.

In step 512, the SPM observes each memory access request processed by system traffic controller 110 and identifies which address region is being accessed by evaluating the proffered address.

In step 514, the SPM determines if a resource that initiated the memory access request to the identified region has access rights for the identified region by comparing the resource ID provided with the memory access request to the access rights assigned to the identified address space region. If the requesting resource has access rights to the region, then the SPM allows the access in step 516. If the requesting resource does not have access rights to the region, then the SPM causes the access request to be aborted and indicates an error condition in step 520.

During execution of application software, it may be necessary to reconfigure system resources. To accommodate this, access rights may be changed by modifying an appropriate entry(s) in the SPM. Again, each time the SPM is accessed, the security sequence of step 502 must be successfully completed before access is allowed, otherwise the access is aborted.

Figure 6:
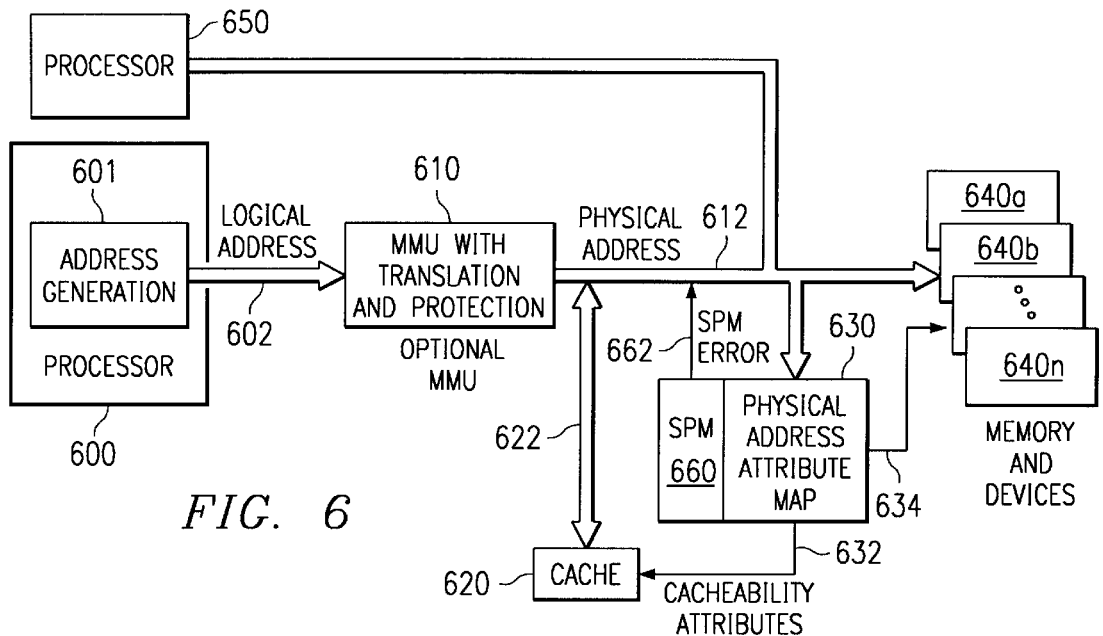
FIG. 6 is a block diagram of another digital system that has a shared cache and a Physical Address Attribute Map (PAAM) and that includes an embodiment of the present invention.

FIG. 6 is a block diagram of another digital system that has a shared cache and a Physical Address Attribute Map (PAAM) and that includes an embodiment of the present invention. DSP 600 includes circuitry for an instruction execution pipeline. Included within the execution pipeline is address generation circuitry that forms addresses on address bus 602 for accessing data and instructions from memory and device circuitry 640a–640n. Memory mapped registers and interfaces to various physical devices such as timers, serial ports, parallel ports, etc are also included within memory and device circuitry 640a–640n. A memory management unit (MMU) 610 is connected to the DSP address generator via address bus 602. MMU 610 translates logical addresses on address bus 602 to physical addresses that are provided to physical address bus 612. Logical addressing provides a stable frame of reference for instructions and data that is not directly tied to the actual physical memory connected to DSP 600. One skilled in the art is aware of the operation of MMU units in general for address translation, so the operation of MMU 610 will not be described further herein. For purposes of the present invention, the presence of MMU 610 is optional. In fact, currently a majority of DSP systems do not include a memory management unit such as MMU 610. In the absence of MMU 610, the address generation circuitry of DSP 600 generates physical addresses instead of logical addresses and physical address bus 612 is connected directly to address bus 602 of DSP 600.

Processor 650 is also connected to physical address bus 612 and shares access to memory and device circuitry 640a–640n. Processor 650 and DSP 600 both execute independent OSs. In another embodiment, DSP 600 may be a processor type other than a DSP. DSP 600 and processor 650 are representative of two processors of various types sharing access to shared resources while executing independent OSs. According to an aspect of the present invention, a system protection map 660 is provided to allow access to an address space region by one or the other processor resources only if the resource has access rights to the identified region, as described earlier.

Still referring to FIG. 6, cache memory 620 is connected to physical address bus 612 and provides requested instructions and/or data to DSP 600 faster than memory circuits 640a–640n. Bus 622 represent both the address bus connected to the cache as well as a data bus that provides accessed instructions and/or data to a central processing unit (CPU) of DSP 600. One skilled in the art is familiar with cache circuits, so the operation of cache circuit 620 will not be described in detail herein. Physical Address Attribute Map (PAAM) 630 is also connected to physical address bus 612 and is used to describe to cache 620 and DSP 600 the capabilities of underlying hardware in the on-chip or off-chip system at any given physical address. If the underlying hardware is random access memory (RAM) with memory semantics, the cache can take a number of liberties with access to the location. If the underlying hardware is the receive FIFO buffer of a serial port, for example, the semantics are very different than RAM and the cache must take care not to mask the volatile behavior of the FIFO.

PAAM 630 is normally consulted only on cache misses. The properties for an address that triggers a cache miss that are produced by PAAM 630 are coupled to cache 620 via cacheability attribute signals 632. Cache 620 responds to the cacheability attribute signals to select a sensible cache behavior for the kind of resource implemented at the physical address that triggered the cache miss. Attribute signals 634 are also provided to the various memory circuits 640a–640n to convey information to the bus interface to better utilize the addressed device.

Several assumptions can be made about embedded systems that typify DSP systems, such as the system of FIG. 6. For example, as discussed above, an MMU may be present but often is not needed and is not present. Physical address space is populated with RAM, read only memory (ROM) and various devices such as input/output (I/O), timers, etc. Program access to ROM and the various devices is not rare. Caches in embedded systems must behave reasonably based on whether the physical address backing up the location is RAM, ROM or a device, with or without the presence of an MMU. Once an embedded system is designed and fabricated, composition and address assignments of RAM, ROM and devices rarely, if ever, change, unless the address mapping is programmable. It is generally important to be aware of empty address space so that an erroneous access to an empty memory space address does not result in a system delay but is instead promptly reported as an error to be handled appropriately. Errors are signaled in several ways: by bus transaction completion status or by interrupt, for example. Once signaled, the processor responds by setting an error status, by vectoring to an interrupt or by entering an exception handler, depending on circumstances.

Many different operating systems (OS) are employed by various embedded systems, including: commercial, homegrown, and bare hardware. Advantageously, use of a physical address attribute map in conjunction with a system protection map can improve operational reliability of a digital system equipped with any of these operating systems.

Figure 7:
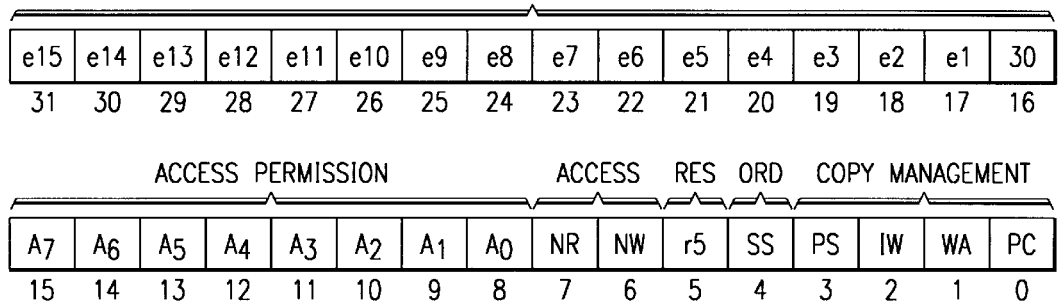
FIG. 7 illustrates a set of physical address attributes for each entry of the physical address attribute maps of FIG. 6.

FIG. 7 illustrates a set of physical address attributes for each entry of the physical address attribute map of FIG. 6. The attributes of a region of the physical address space are specified by a PAAM entry of 32 bits. The bits are divided into several groups: copy management, order specifiers, access specifiers, and sub-region empty flags, as described below. Advantageously, each region of PAAM 630 is also treated as a region for SPM 660 and a shared entry is used.

Four attribute specifier bits are included in the Copy Management group and are defined to control the behavior of caching mechanisms that can make copies of data from the region, as shown in Table 1. These specify what a cache implementation may or must do under certain circumstances when accessing data from this region.

TABLE 1

Copy Management Attribute Bits

| | |
|---|---|
| PC<br>Permit<br>Copies | If PC is 0, copies of data from addresses in this region are not permitted. Usually, PC is zero for device registers that could return different values on successive reads. If PC is 1, copies are permitted.<br>If PC is 0, reads from this address region that miss in any cache must not be allocated in the cache. Thus, caching is effectively disabled for this address region. If PC is 1, then reads from this address that miss in a cache may be allocated in the cache. A PC of 1 does not require the caching. Note that cache hits need never consult this bit.<br>When changing PC from 1 to 0, there is no automatic action that ensures that no cache contains a copy that was previously permitted. Under most circumstances, the software that sets PC to 0 will need to flush at least those cache entries that correspond to addresses in the affected region. |
| WA<br>Write<br>Allocate | The device(s) in this region of the address space has timing which benefits from write allocation. If WA is 1 and PC is 1, a write that misses the cache may be allocated in the cache. If WA is 0, a write may hit in the cache if the data is already present in the cache, but if the cache misses, the next access to that address must still miss the cache because the address must not be allocated in the cache. |
| IW<br>Immediate<br>Write | If IW is 1, every store to an address in this region must be sent to the device immediately. If the address hits in a data cache or store buffer, the store also updates the cache contents. If IW is 0, stores that hit in a data cache are not sent to the device until the cache line is evicted, usually after absorbing more than one store. (Immediate Write behavior can also be called Write Through behavior.<br>An immediate write is performed in order at the device and each write appears distinctly at the device. This definition does not allow write merging, but does allow some buffering. Reads to other addresses may complete before the immediate write, but read operations to the same address cannot occur before the write completes. (c.f., SS)<br>Proper operation of caches will require that IW be copied to cache tags for blocks that are allocated in caches (because they have PC set). |
| PS<br>Possible<br>Sharing | If PS is 1, cached copies if any of data in this region may be shared. If PS is 0, cached copies may assume no sharing occurs.<br>PS is provided because implementations often have a performance cost to coherence operations on data that might be shared. Data areas that are never shared may be accessed without this performance cost on some implementations. In particular, other processors or DMA activity on regions with PS of 0 will not use modified copies in cache memories or update the cache memories with new values. Choosing PS of 0 for regions with PC of 1 and NW of 0 should be carefully checked to be sure that the software would use the memory without any reliance on coherence. |

There is an order specifier bit, referred to as Synchronous Store (SS) in FIG. 7. It is utilized in system embodiments that support out-of-order memory operations. The SS bit forces stores to this area to be in a strictly specified order. A store to an address with SS of one is a synchronous store. The DSP pipeline must not perform other load or store operations until this store is complete at the device. SS of 1 is only meaningful when IW is 1 or PC is 0. If PC is 1 and IW is 0, the operation of the chip is undefined and may vary from implementation to implementation. If SS is 1, PC is 1, IW is 1 and WA is 1, the situation might arise when a write to the region causes a write allocation. In this case, the operation is defined to perform the cache eviction if needed and the cache line read before performing a synchronous write to the device and to the cache(s).

The access specifier group indicates whether the device supports read operations and/or write operation s, as defined in Table 2.

TABLE 2

Access Specifier Attribute Bits

| | |
|---|---|
| NW<br>No<br>Write | If NW is 1, this address does not support write operations. Any attempt to write to an address marked with NW = 1 is an error. If the address is on an external bus, the bus should not show a transaction for this address, but instead an error should be reported. Early devices may omit detecting and reporting this error. When NW is 0, writes are permitted. |
| NR<br>No<br>Read | If NR is 1, any read access to this device is in error. If the address is on an external bus, the bus should not show a transaction for this address, but instead an error should be reported. Early implementations may omit detecting and reporting this error. When NR is 0, reads are permitted. |

Note:
NR governs both data reads (LDx) and program fetches. A program fetch from a device at an address with NR = 1 is a Device Capability Error, just as is a LD instruction that addresses such a device.

Sub-Region Empty Flags e15–e0 indicate sub-regions that are empty. Each region is divided into sixteenths, and each is controlled by one of these flags. If a sub-region flag is 0, the region specifiers NR, NW, SS, PS, IW, WA, and PC control the sub-region. If a sub-region flag is 1, the sub-region has the implied specifiers PAAM_EMPTY (NR and NW are 1, all others are 0).

Access permission bits A7–A0 assign access rights for each address space region for use by SPM 660. Each of bits A7–A0 controls access to that region of the address space by an initiator resource whose initiator resource ID matches the subscript. Therefore, up to eight initiator resources may be designated and assigned access rights to any one address space region, as described earlier.

Reserved Bits r5 is reserved and must read as zero in the present embodiment. Writes to this bit must be ignored. Other embodiments may define this bit for various functions.

Table 3 illustrates a set of definitions that can be used within an initialization program of an embedded system to program the programmable entries in the PAAM. By using defines 9–16, a program can be written to get appropriate behavior for most common devices in a system. For example, define 9 is stored into each PAAM table entry that corresponds to an address region that is not implemented. Define 14 is stored into each PAAM table entry that corresponds to a memory region that is implemented as a ROM. Other entries in the PAAM are loaded appropriately, in accordance with the characteristic of the associated address region.

A similar set of definitions is provided in Table 4 for a trusted agent or task to program the programmable entries in the SPM. For example, to give access to an SRAM to R-IDs 2 and 7 one could type: pamwd=PAAM_SRAM+PAAM_SPM_RID_2+PAAM_SPM_RID_7; The variable "pamwd" would be set to the constant 0x0000840B.

A PAAM should, itself, be in a region coded as PAAM_DEV, define 15. Because that sets SS, a change to a PAAM entry will be immediately recognized on the next DSP load or store operation. When modifying a PAAM, it is sometimes necessary to flush associated caches. A cache should be flushed of addresses in a region covered by a modified region entry when the following occur, for example: clearing PAAM_PC, setting PAAM_IW when PAAM_PC is set in the entry, setting PAAM_NW or PAAM_NR when PAAM_PC is set in the entry, or when setting PAAM_PS when PAAM_PC is set in the entry.

TABLE 3

Example Definitions for Attribute Entries

| | | |
|---|---|---|
| 1 | #DEF PAAM_PC | 1 |
| 2 | #DEF PAAM_WA | 2 |
| 3 | #DEF PAAM_IW | 4 |
| 4 | #DEF PAAM_PS | 8 |
| 5 | #DEF PAAM_SS | 0x10 |
| 6 | #DEF PAAM_R5 | 0x20 |
| 7 | #DEF PAAM_NW | 0x40 |
| 8 | #DEF PAAM_NR | 0x80 |
| 9 | #DEF PAAM_EMPTY | PAAM_NR + PAAM_NW |
| 10 | #DEF PAAM_RW_MEM | PAAM_PC + PAAM_PS |
| 11 | #DEF PAAM_SRAM | PAAM_RW_MEM + PAAM_WA |
| 12 | #DEF PAAM_DRAM | PAAM_RW_MEM + PAAM_WA |
| 13 | #DEF PAAM_MEM_SLOW | PAAM_RW_MEM |
| 14 | #DEF PAAM_ROM | PAAM_PC + PAAM_NW |
| 15 | #DEF PAAM_DEV | PAAM_SS |
| 16 | #DEF PAAM_FR_BUF | PAAM_PC + PAAM_IW |

TABLE 4

Example Definitions for SPM Entries

| | | |
|---|---|---|
| 1 | #DEF PAAM_SPM_RID_0 | 0x00000100 |
| 2 | #DEF PAAM_SPM_RID_0 | 0x00000200 |
| 3 | #DEF PAAM_SPM_RID_0 | 0x00000400 |
| 4 | #DEF PAAM_SPM_RID_0 | 0x00000800 |
| 5 | #DEF PAAM_SPM_RID_0 | 0x00001000 |
| 6 | #DEF PAAM_SPM_RID_0 | 0x00002000 |
| 7 | #DEF PAAM_SPM_RID_0 | 0x00004000 |
| 8 | #DEF PAAM_SPM_RID_0 | 0x00008000 |

The IW and WA specifiers interact. The behavior of a fully functional cache system to these two is shown in Table 5. Note that various system implementations may ignore WA under some or all circumstances.

TABLE 5

IW and WA interactions

| WA = | 0 | 0 | 1 | 1 |
|---|---|---|---|---|
| IW = | 0 | 1 | 1 | 0 |
| Write Hit | Write to cache | Write to device and to cache | Write to device and to cache | Write to cache. |
| Write Miss | Write to device | Write to device. | Allocate write to cache and to device | Allocate. Write to cache. |

When a 16-MB region of memory contains devices of several types, the PAAM entry must be set to capabilities compatible with all devices in the region. Usually, this means that PC is only set if all devices in the region can be cached. NR and NW are only set if they apply to all devices in the region. IW must be set if any device in the region needs it.

In alternative embodiments of the invention, there is a great latitude in choosing how much of the specified SPM/PAAM to implement. The choices involve balancing the features and flexibility of programmable SPM/PAAM registers versus the cost of implementing the full mechanism. A system implementations may reduce the amount of chip area used by the SPM/PAAM in two ways: (1) constant entries, (2) implementing only certain bits per register.

(1) Many portions of many physical address space maps will not need programmable SPM/PAAM registers and can be implemented with constant entries. Large parts of the physical address space might not have any devices. In addition, physical address space that maps to on-chip devices might not need programmable registers, or might require only certain bits to be programmable, for example, an on-chip RAM might require only the PS bit and the An bits. Generally, full programmability (to the extent implemented) should be afforded to external buses that can be configured to contain devices not known when an IC or a megamodule that includes a SPM/PAAM is designed.

(2) An implementation may implement only some of the specifier bits. A chip must implement PC if it has caches. It may also implement the other copy management bits. If memory sharing is supported, PS may be implemented. Cache snooping may be implemented to support sharing. A chip may implement WA and IW if its cache can make use of these values. A chip must implement NR and NW if it supports error detection, but may omit them if not. A chip that can provide sufficient synchronization of I/O device writes without implementing SS may omit it. If the chip implements out-of-order memory operations that prevent the reliable operation of devices with multiple control registers, it must implement SS. In portions of the map that have programmable registers, a write must set or clear bits that are implemented. Unimplemented bits must always read back as 0. Implementations that have cache systems that always perform write allocation or write back, may have the PAAM return constant 1 for those bit positions. However, the PAAM is not expected to return different values based on cache configuration or contents. Implementation may choose not to implement the sub-region empty flags. In this case, all sixteen will read as 0 and be ignored on write. These implementations will use the specifiers in a given entry for all sub-regions associated with that entry.

In an alternative embodiment, a portion of the address can be covered by a direct mapped table, and another portion of the address space can be covered by one or more associatively mapped comparison blocks.

In an alternative embodiment each comparison block of various associatively mapped embodiments may compare all bits of the physical address, or a limited number of bits of the physical address, resulting in courser grain address ranges.

In an alternative embodiment, implementations that implement PS might need programmable registers for on-chip memory that can be shared and in some embodiments, the PS bit from PAAM might be used in combination with information from the processor such as opcode used and/or information from the MMU to determine the sharing status of the data in cache.

A detailed description of the operation of the PAAM is provided in U.S. patent application Ser. No. 09/702,477 (TI-29846) entitled CACHE MEMORY CONTROLLED BY SYSTEM ADDRESS PROPERTIES, and is incorporated herein by reference.

Figure 8:
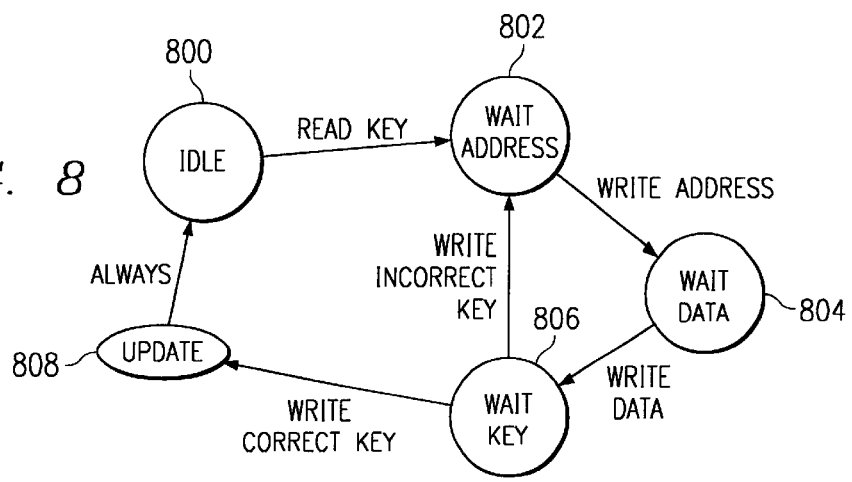
FIG. 8 is a state diagram for lock and key access sequence mechanism for protecting access to the SPM of FIG. 1 or FIG. 6.

FIG. 8 is a state diagram for a lock and key access sequence mechanism for protecting access to the SPM of FIG. 1 or FIG. 6. In this embodiment, it is expected that only a single processor will update the SPM or SPM/PAAM circuitry from a trusted system protection device driver. A pseudo-random sequence generator lock and key sequence is provided to prevent a non-trusted or accidental access to the SPM or SPM/PAAM.

A lock and key state machine is in an idle state 800 until a key register is read by a resource that is attempting to update the SPM or PAAM. The key register provides a seed value that is used by the updating initiator resource to calculate a new key value using a pseudo random algorithm (PRA). The key checker uses a particular PRA built in and the software must emulate that particular algorithm so that the value it computes for the key challenge register agrees with the value computed as part of the SPM protection logic.

Then state 802 waits for an update-address register to be written, then state 804 waits for an update-data register to be written. State 806 then waits for the new key value to be written to a key-challenge register. The lock and key circuitry generates a new pseudo random value that is compared to the new key value. If they are the same, then the state machine moves to state 808 and the SPM/PAAM circuitry is updated with the provided data value at the specified update-address position. If the new key value does not match, then the SPM or PAAM is not updated and the state machine moves to state 802 and waits for a retry. If the sequence is not traversed in the specified order, the SPM or PAAM is not updated.

Figure 9:
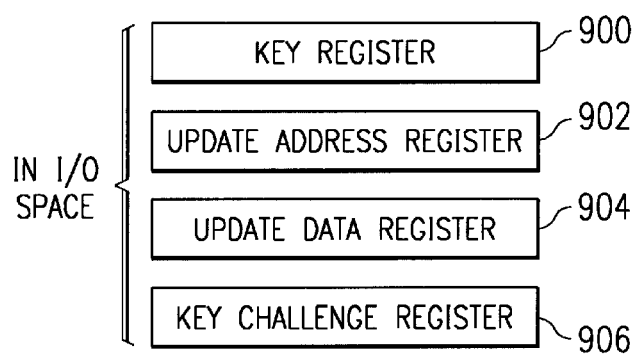
FIG. 9 is a register map illustrating a memory mapped interface for the lock and key access sequence state machine of FIG. 8.

FIG. 9 is a memory map illustrating a memory mapped interface for the lock and key access sequence state machine of FIG. 8. Key register 900 is read by the trusted agent to obtain a key seed value. Update-address register 902 receives an address and update-data register 904 receives the data value that is to be written to the address provided to register 902. Key-challenge register 906 receives the new key that is calculated by the trusted agent in response to the reading the key seed value. If the new key value is the correct key, then the state machine copies data in update register 904 into the SPM at the address specified address register 902. The trusted agent can then read register 908 to get confirmation that the sequence has been successfully completed.

If an incorrect new key value is written to key challenge register 906, then the SPM or PAAM is not updated and register 906 is set to a default value. The trusted agent can then read register 906 to get confirmation that the sequence has been successfully completed or not. Additionally, an error is indicated on interrupt signal 152 of FIG. 1 or interrupt signal 662 of FIG. 6. For a key protection failure it is preferable to cause an interrupt rather than just generate a bus error.

This embodiment uses four memory mapped register positions. One skilled in the art is aware that other register schemes can be used to implement such an access protection mechanism. An alternative embodiment may provide a different type of SPM access protection or may dispense with SPM access protection altogether.

System Embodiments

Several example systems that can benefit from aspects of the present invention are described in U.S. Pat. No. 5,072,418, which is incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 10:
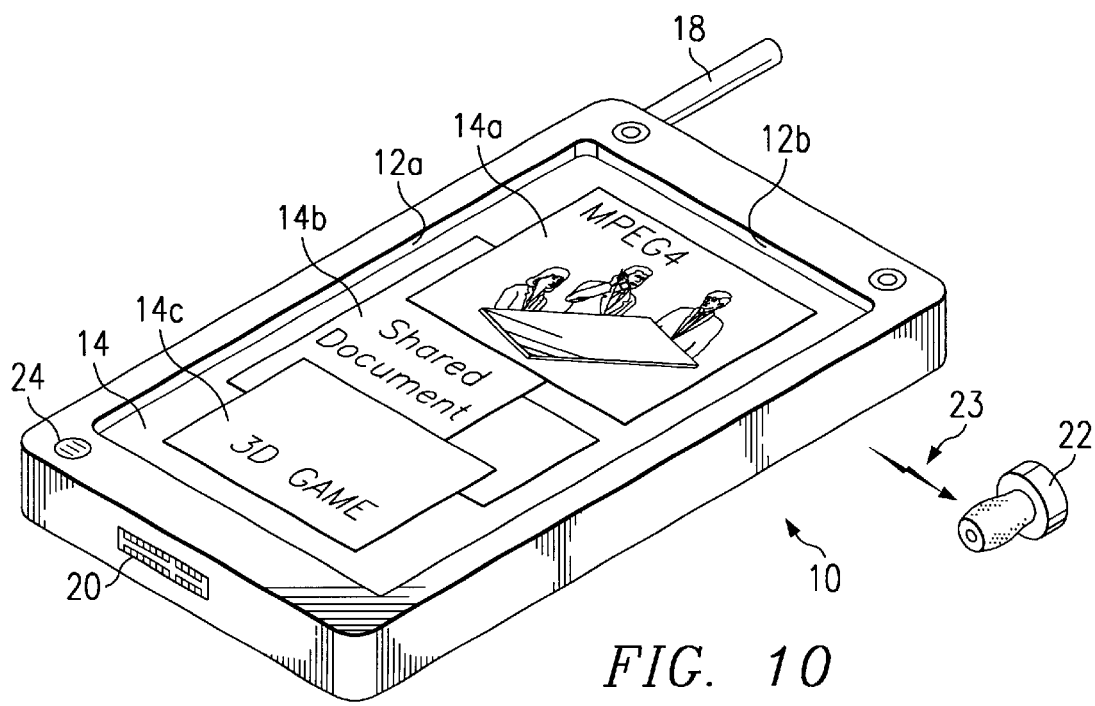
FIG. 10 illustrates a wireless personal digital assistant that includes an embodiment of the present invention.

FIG. 10 illustrates an exemplary implementation of an example of such an integrated circuit in a mobile telecommunications device, such as a mobile personal digital assistant (FDA) 10 with display 14 and integrated input sensors 12a, 12b located in the periphery of display 14. As shown in FIG. 10, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless earpiece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the preceding digital system involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An integrated circuit that includes any of the above embodiments includes a plurality of contacts for surface mounting. However, the integrated circuit could include other configurations, for example a plurality of pins on a lower surface of the circuit for mounting in a zero insertion force socket, or indeed any other suitable configuration.

Digital system 100 contains hardware extensions for advanced debugging features. These assist in the development of an application system. Since these capabilities are part of the cores of CPU 102, 104 itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a system protection map to provide processor to processor protection whether or not an address translation map is provided.

Advantageously, many programming errors that occur due to an independent operating system on one processor inadvertently trampling on a resource being used by a different independent operating system on another processor can be detected and reported.

Advantageously, the system protection map can be combined with a physical address attribute map to provide an even more robust system.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, provision for a different number of resources may be made in the SPM entries. For example, only four bits can distinguish two processors, a DMA engine, and a single master peripheral. Different types of external memory resources may be provided. Different sizes and configurations of physical address and data busses may be provided. Multiprocessor systems may be configured in which requests from other processors are coordinated by transfer request circuitry.

It is therefore contemplated that the appended claims will cover any such modifications of the embodiments as fall within the true scope and spirit of the invention.

What is claimed is:

1. A method for operating a digital system having a plurality of resources connected to a shared memory subsystem, comprising the steps of:
   defining a plurality of regions within an address space of the shared memory subsystem;
   assigning initiator access rights to at least a portion of the plurality of regions;
   identifying which of the plurality of regions is being accessed by a memory access request from the plurality of resources;
   recognizing which of the plurality of resources initiated the request;
   determining if the recognized resource that initiated the memory access request to the identified region has initiator access rights for the identified region;
   allowing access to the identified region by the recognized resource only if the recognized resource has initiator access rights to the identified region; and
   operating a cache of the shared memory subsystem in a first mode in response to one instance of allowing access to the cache as the identified region and operating the cache in a second mode in response to another instance of allowing access to the cache as the identified region.

2. The method of claim 1, further comprising the step of providing a resource identification value with the memory access request from the plurality of resources for use in the step of recognizing.

3. The method of claim 2, wherein the step of identifying comprises monitoring an address of the memory access request and selecting one of the plurality of regions according to the address.

4. The method of claim 3, wherein the step of determining compares the resource identification value provided with the memory access request to an initiator access right value assigned to the identified region.

5. The method of claim 1, wherein each of the plurality of regions has a same size within the address space.

6. The method of claim 1, further comprising the step of providing a resource identification value with each memory access request from the plurality of resources for use in the step of recognizing.

7. The method of claim 1, wherein a portion of the plurality if resources are processors and wherein each of the processors operate under a separate operating system.

8. The method of claim 1, wherein at least one of the plurality of resources is a direct memory access controller.

9. The method of claim 1, wherein at least one of the plurality of resources is an I/O master.

10. The method of claim 1, wherein the step of defining a plurality of regions comprises the step of setting up a table of region boundary values.

11. The method of claim 10, wherein the step of defining further comprises the step of protecting modification access to the table by requiring successful completion of an access sequence before modification of the table is permitted.

12. The method of claim 1, wherein the step of assigning initiator access rights to a first region provides initiator access rights to at least two initiator resources while in a second region access rights are provided to only a single initiator resource.

13. The method of claim 12, wherein the step of assigning initiator access rights further comprises permitting write access in the first region to only one of the at least two initiator resources.

14. A method for operating a digital system having a plurality of resources including a plurality of processors connected to a shared memory subsystem, comprising the steps of:
   executing separate operating systems on each of at least two of the plurality of processors;
   defining a plurality of regions within an address space of the shared memory subsystem, wherein the step of defining a plurality of regions comprises the step of setting up a table of region boundary values that is accessible to each of at least two processors in the plurality of processors;
   assigning resource initiator access rights to at least a portion of the plurality of regions;
   identifying which of the plurality of regions is being accessed by a memory access request from the plurality of resources;
   recognizing which of the plurality of resources initiated the request;
   determining if the recognized resource that initiated the memory access request to the identified region has initiator access rights for the identified region; and
   allowing access to the identified region by the recognized resource only if the recognized resource has initiator access rights to the identified region; and operating a cache in a first mode in response to identifying an access in a first region of the plurality of regions and operating the cache in a second mode in response to identifying an access in a second region.

15. The method of claim 14, wherein the step of defining further comprises the step of protecting modification access to the table by requiring successful completion of an access sequence before modification of the table is permitted.

16. The method of claim 14, further comprising the step of operating the memory subsystem in a first mode in response to identifying an access in a third region of the plurality of regions and operating the memory subsystem in a second mode in response to identifying an access in a fourth region.

17. A digital system comprising:
   a plurality of processors connected to access a shared memory subsystem, the shared memory subsystem comprising a cache;
   resource identification means connected to the plurality of processors for indicating which of the plurality of processors is requesting access to the shared memory subsystem; and
   protection circuitry connected to receive a resource identification value from the resource identification means in response to an access request to the shared memory subsystem, the protection circuitry operable to inhibit access to the shared memory subsystem in response to the resource identification value; and
   circuitry for operating the cache in a first mode in response to one instance of the protection circuitry allowing access to the cache and for operating the cache in a second mode in response to another instance of the protection circuitry allowing access to the cache.

18. The system of claim 17, wherein the protection circuitry comprises:
   means for defining a plurality of regions within an address space of the shared memory subsystem;
   means for assigning initiator access rights to at least a portion of the plurality of regions;
   means for identifying which of the plurality of regions is being accessed by a memory access request from the plurality of processors; and
   means for comparing a resource identification value to an access right of an identified one of the plurality of regions.

19. The digital system according to claim 18 being a personal digital assistant, further comprising:
   a display connected to a first one of the plurality of processor via a display adapter;
   radio frequency (RF) circuitry connected to the processor; and
   an aerial connected to the RF circuitry.

20. A digital system comprising:
   a shared memory subsystem;
   a plurality of resources including a plurality of processors connected to the shared memory subsystem, and programmed to perform the steps of:
      executing separate operating systems on each of at least two of the plurality of processors;
      defining a plurality of regions within an address space of the memory subsystem, wherein the step of defining a plurality of regions comprises the step of setting up a table of region boundary values that is accessible to each of at least two processors in the plurality of processors;
      assigning resource initiator access rights to at least a portion of the plurality of regions;
      identifying which of the plurality of regions is being accessed by a memory access request from the plurality of resources;
      recognizing which of the plurality of resources initiated the request;
      determining if the recognized resource that initiated the memory access request to the identified region has initiator access rights for the identified region;
      allowing access to the identified region by the recognized resource only if the recognized resource has initiator access rights to the identified region; and
      operating a cache in a first mode in response to identifying an access in a first region of the plurality of regions and operating the cache in a second mode in response to identifying an access in a second region.

* * * * *